US006181951B1

United States Patent
Garner et al.

(10) Patent No.: US 6,181,951 B1
(45) Date of Patent: Jan. 30, 2001

(54) MOBILE TELEPHONY STANDARDS CONVERTER

(75) Inventors: William J. Garner, Yardley, PA (US); Zhihong Huang, Edison; Winston H. Lieu, Holmdel, both of NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/382,861

(22) Filed: Aug. 25, 1999

Related U.S. Application Data

(62) Division of application No. 08/990,852, filed on Dec. 15, 1997.

(51) Int. Cl.[7] .................................................. H04Q 7/34
(52) U.S. Cl. .................... 455/552; 455/423; 455/561; 455/443; 379/32
(58) Field of Search .................... 455/561, 552, 455/443, 423; 379/32

(56) References Cited

U.S. PATENT DOCUMENTS

| | | | |
|---|---|---|---|
| 5,481,588 | * 1/1996 | Rickli et al. | 379/32 |
| 5,504,800 | 4/1996 | Yehushua et al. | 379/27 |
| 5,878,349 | * 3/1999 | Dufour et al. | 455/438 |
| 5,898,905 | 4/1999 | Aldridge et al. | 455/67.4 |
| 5,898,913 | * 4/1999 | Pengelly et al. | 455/326 |
| 5,930,728 | * 7/1999 | Evanyk | 455/561 |

* cited by examiner

Primary Examiner—Daniel S. Hunter
Assistant Examiner—Alan Gantt
(74) Attorney, Agent, or Firm—Fish & Neave; Jeffrey H. Ingerman

(57) ABSTRACT

An adapter/converter circuit converts transmissions by a mobile telephone built for one standard (e.g., PCS) from the telephone transmit/base station receive frequency of that one standard to the telephone transmit/base station receive frequency of another standard (e.g., cellular), and converts transmissions by a base station or similar device (e.g., a base station simulator) from the telephone receive/base station transmit frequency of the one standard to the telephone receive/base station transmit frequency of the other standard. The two frequency conversions occur simultaneously on two parallel legs under the control of a PLL dual frequency synthesizer, which is in turn controlled by user input (in the case where the adapter is used to allow, e.g., PCS telephones to be tested on cellular test equipment) or by the base station (in the case where the adapter is used to allow, e.g., PCS telephones to be used with a cellular base station).

7 Claims, 2 Drawing Sheets

MOBILE TELEPHONY STANDARDS CONVERTER

CROSS REFERENCE TO RELATED APPLICATION

This is a division of copending, commonly-assigned U.S. patent application Ser. No. 08/990,852, filed Dec. 15, 1997.

BACKGROUND OF THE INVENTION

This invention relates to a standards converter for allowing a mobile telephone which communicates on a first mobile telephony standard to interface with a base unit which communicates on a second mobile telephony standard. More particularly, this invention relates to a converter that allows a mobile telephone that operates at PCS frequencies to interface with a base unit that operates at cellular telephone frequencies.

Different mobile telephone standards are currently in use. Mobile telephones communicate with base stations in a full-duplex mode in which each channel uses two different frequencies so that each mobile telephone can transmit to the base station and receive from the base station at the same time. This is important because all control of any telephone call is accomplished by the base station, so that even when a user is transmitting, the base station must be able to send control information to the mobile telephone (e.g., if the telephone is in motion, the base station must be able to instruct the telephone to change channels as it is handed off to another base station). Under the standard (as used herein, the term "standard" refers to the agreed-upon frequencies at which a system operates, and not to other "standards" such as those that govern how speech is encoded, etc.) for one type of mobile telephone system known as "cellular," each mobile telephone transmits at any one of a number of frequencies between about 824.01 MHz and about 848.97 MHz and receives at any one of a number of frequencies between about 869.01 MHz and about 893.97 MHz (the individual frequencies within those bands are separated by about 30 kHz). Under the standard for another type of mobile telephone system known as "PCS" (for "Personal Communications Service"), each mobile telephone transmits at any one of a number of frequencies between about 1850.01 MHz and about 1909.95 MHz and receives at any one of a number of frequencies between about 1930.05 MHz and about 1989.99 MHz.

Base stations for mobile telephone systems are generally manufactured for one standard. Similarly, testing equipment, such as that used to test mobile telephones as they are manufactured or are being repaired, typically is provided for testing mobile telephones under only one standard. In the mobile telephone manufacturing and repair context in particular, this requires mobile telephone manufacturing and repair facilities to have a different testing device for each type of mobile telephone that it manufactures or repairs. And because a mobile telephone base station can operate on only one standard, a mobile telephone service provider who provides service under more than one standard must purchase and maintain a variety of different types of base station equipment for the different standards.

It would be desirable to be able to provide a converter that would allow equipment designed for one mobile telephone standard to be used with mobile telephones designed for a different mobile telephone standard.

It would also be desirable to be able to provide an adapter that would allow testing equipment for one type of mobile telephone to be used to test a different type of mobile telephone.

It would further be desirable to be able to provide an adapter that would allow a base station for one type of mobile telephone to be used with a different type of mobile telephone.

SUMMARY OF THE INVENTION

It is an object of this invention to provide a converter that would allow equipment designed for one mobile telephone standard to be used with mobile telephones designed for a different mobile telephone standard.

It is also an object of this invention to provide an adapter that would allow testing equipment for one type of mobile telephone to be used to test a different type of mobile telephone.

It is a further object of this invention to provide an adapter that would allow a base station for one type of mobile telephone to be used with a different type of mobile telephone.

In accordance with this invention there is provided a standards converter for allowing a mobile telephone which transmits, at any one time, on one transmit frequency of a first set of transmit frequencies and which receives, at any one time, on one receive frequency of a first set of receive frequencies, to communicate with a base unit which transmits, at any one time, on one transmit frequency of a second set of transmit frequencies and which receives, at any one time, on one receive frequency of a second set of receive frequencies. The standards converter includes a first interface which receives from the mobile telephone a signal at the one transmit frequency of the first set of transmit frequencies and which transmits to the mobile telephone a signal at the one receive frequency of the first set of receive frequencies. A second interface receives from the base unit a signal at the one transmit frequency of the second set of transmit frequencies and transmits to the base unit a signal at the one receive frequency of the second set of receive frequencies. A first propagation path propagates the signal at the one transmit frequency of the first set of transmit frequencies from the first interface to the second interface. A second propagation path propagates the signal at the one transmit frequency of the second set of transmit frequencies from the second interface to the first interface. A first frequency converter along the first propagation path converts the one transmit frequency of the first set of transmit frequencies to a corresponding frequency of the second set of receive frequencies. A second frequency converter along the second propagation path converts the one transmit frequency of the second set of transmit frequencies to a corresponding frequency of the first set of receive frequencies.

Testing apparatus, as well as base station equipment, incorporating such a converter as an adapter, are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
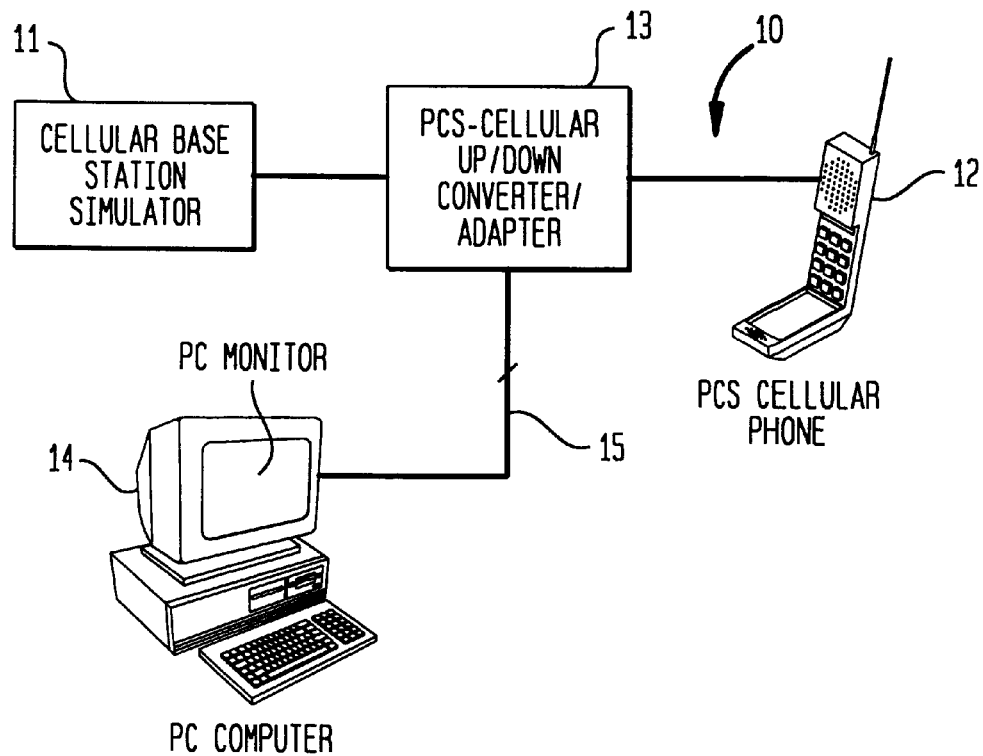
FIG. 1 is a schematic block diagram of testing apparatus according to the present invention.

In accordance with the present invention, testing equipment designed to test cellular mobile telephones can be used to test PCS mobile telephones. Similarly, base station equipment designed to communicate with cellular mobile telephones can be used to communicate with PCS mobile telephones. Alternatively, PCS base station or testing equipment can be used with cellular mobile telephones, or equipment for any other combinations of standards can be used together. This allows manufacturers and/or service providers to buy only one type of equipment.

The mixing of equipment designed for different standards is made possible by an adapter/converter circuit that converts transmissions by a mobile telephone built for one standard from the telephone transmit/base station receive frequency of that one standard to the telephone transmit/base station receive frequency of another standard, and that converts transmissions by a base station or similar device (e.g., a base station simulator) from the telephone receive/base station transmit frequency of the one standard to the telephone receive/base station transmit frequency of the other standard.

Preferably, the telephone transmit/base station receive and telephone receive/base station transmit frequency conversions are carried out simultaneously in two parallel circuit legs. Each leg achieves the necessary up-conversion or down-conversion by mixing the incoming transmission with an appropriate local oscillator frequency for the desired conversion. Preferably, the local oscillator for each leg includes a voltage controlled oscillator ("VCO") controlled by the output of a phase-lock loop ("PLL") circuit, with suitable feedback of the VCO output to the PLL circuit. A temperature compensated crystal oscillator preferably provides an accurate reference for the PLL. Preferably also, one dual PLL circuit, which provides two outputs based on two respective inputs (to which the feedback from each respective VCO is applied), but requires only a single crystal standard, is used in place of two separate PLL circuits. However, separate PLL circuits may be provided instead, if appropriate or desired.

Because the telephone and base station or simulator may operate at any one of a number of frequencies within the appropriate frequency range, the frequency conversion circuits must be capable of adjustment, rather than being calibrated to a single frequency each. Preferably, the frequency selectivity is accomplished by providing a control input (or inputs) to the PLL circuit (or circuits) which can vary the VCO output. In the case of an adapter for a base station simulator, the PLL control input is preferably controlled by a personal computer or similar input device, which a user can operate to select desired frequency (or on which a testing program could be run which automatically selects frequencies for testing purposes). In the case of an adapter for a base station, the PLL control input would preferably be controlled by the base station control system, insofar as the required frequencies change in real time to reflect actual conditions.

The invention will now be described with reference to FIGS. 1–3 which are directed to preferred embodiments for use of PCS mobile telephones with cellular base station equipment.

FIG. 1 shows a system 10 for using a cellular base station simulator to test PCS mobile telephones. System 10 includes a cellular base station simulator, such as a Wavetek® 3600D simulator available from Wavetek Corporation, of San Diego, Calif., connected to a PCS mobile telephone 12 by a PCS-cellular up/down converter/adapter 13 according to the invention. The aforementioned PLL of converter/adapter 13 is preferably controlled by personal computer 14 via control lines 15. Personal computer 14 can be any personal computer, such as one having a microprocessor from the 80×86 family developed by Intel Corporation, of Santa Clara, Calif., running the MICROSOFT® WINDOWS® operating system from Microsoft Corporation, of Redmond, Wash.

Figure 2:
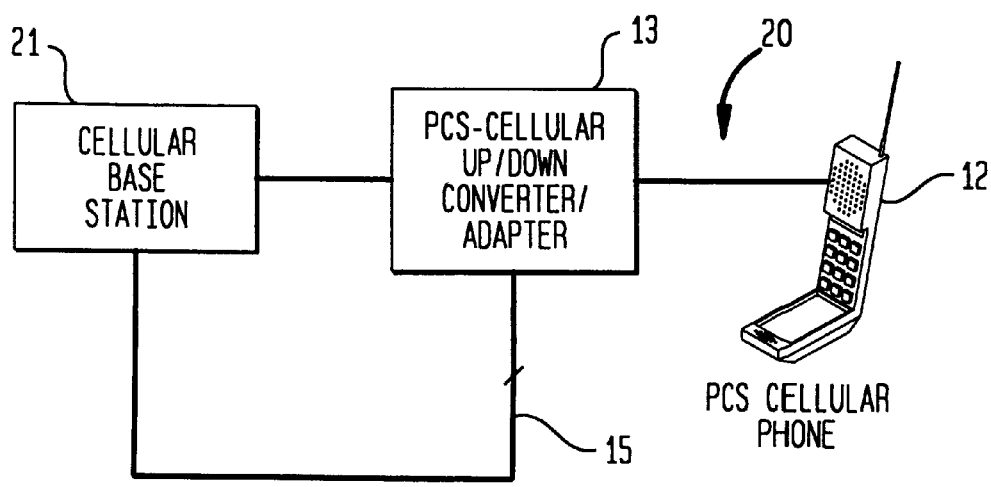
FIG. 2 is a schematic block diagram of a base station according to the present invention.

PCS telephone system 20 of FIG. 2 is similar. System 20 includes a cellular base station 21, such as an HP-8920B, with an HP-83236B PCS interface, available from Hewlett-Packard Company, of Palo Alto, Calif. which communicates with one or more PCS mobile telephones 12 via PCS-cellular up/down converter/adapter 13. However, in system 20, PLL control lines 15 preferably are controlled by the system hardware and software controls in base station 11 for the reasons set forth above.

Figure 3:
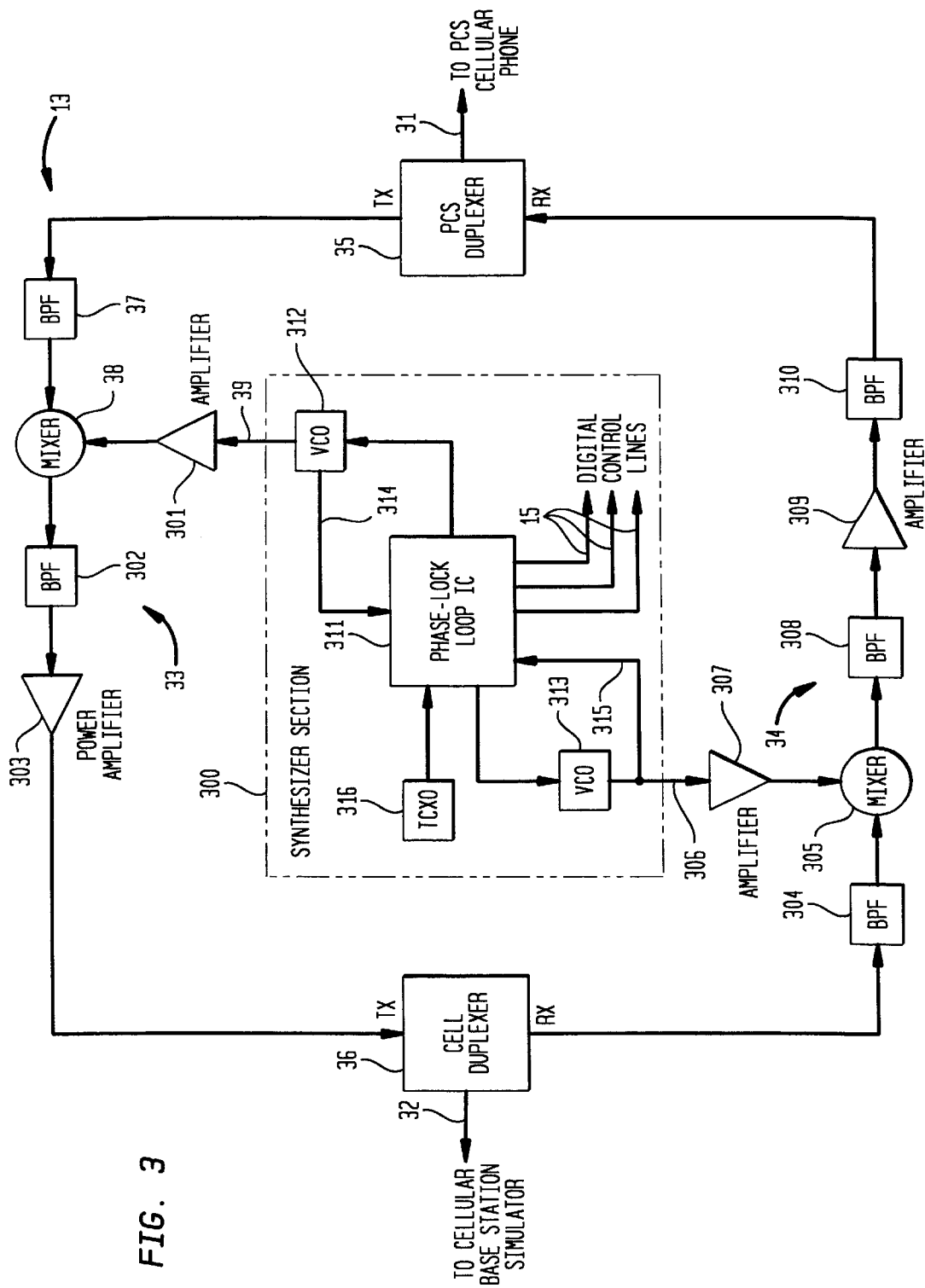
FIG. 3 is a schematic block diagram of an adapter/converter according to the present invention.

PCS-cellular up/down converter/adapter 13 is shown in detail in FIG. 3. Converter/adapter 13 has an interface 31 for connection to telephone 12. In the testing context, the connection to telephone 12 preferably is by cable, while in the base station context, the connection to telephone 12 preferably is by over-the-air transmission and reception. Similarly, converter/adapter 13 has an interface 32 for connection to base station simulator 11 or base station 21, which connection is preferably by cable in either case. Interfaces 31, 32 are preferably connected by a telephone transmit/base station receive frequency downconvert leg 33, and by a telephone receive/base station transmit frequency upconvert leg 34. Legs 33, 34 preferably are connected to interface 31 by PCS duplexer 35 which allows signals from telephone 12 on interface 31 to enter leg 33 but not leg 34, and which allows signals from base station 21 or simulator 11 on leg 34 to enter interface 31 but not leg 33. Preferably, duplexer 35 is a model DFYK1R88C1R96HHD duplexer from Murata Manufacturing Co., Ltd., of Kyoto, Japan. Similarly, legs 33, 34 preferably are connected to interface 32 by cellular duplexer 36 which allows signals from base station 21 or simulator 11 on interface 32 to enter leg 34 but not leg 33, and which allows signals from telephone 12 on leg 33 to enter interface 32 but not leg 34. Preferably, duplexer 36 is a model DFY2R836CR881BHA duplexer from Murata Manufacturing Co., Ltd., of Kyoto, Japan.

The PCS telephone signal to be downconverted on leg 33 is first bandpass filtered by bandpass filter 37, which preferably is a model MDR026B filter from Soshin Electric Co., Ltd., of Tokyo, Japan. This filter has a center frequency of 1880 MHz and a bandwidth of 60 MHz. The filtered signal is then preferably mixed at mixer 38 with transmission local oscillator signal 39 (output by synthesizer section 300) which has been amplified by amplifier 301. Preferably, mixer 38 is a model CMY210 881 MHz–1960 MHz upconverter from Siemens AG, of Munich, Germany, and amplifier 301 is preferably a model UPC2709T from NEC Corporation, of Tokyo, Japan.

The mixed signal is then preferably filtered again at filter 302, which preferably is a model FAR-F5CC-836M50-L2AP filter from Fujitsu, Ltd., of Tokyo, Japan. This filter has a center frequency of 836 MHz and a bandwidth of 25 MHz, before being amplified by power amplifier 303, which preferably is a model PF0231A RF power amplifier from Hitachi, Ltd., of Tokyo, Japan, and then fed to duplexer 36.

The base station/simulator signal to be upconverted on leg 34 is first bandpass filtered by bandpass filter 304, which preferably is a model F5CG-881M50-L2AS filter from Fujitsu, Ltd., of Tokyo, Japan. This filter has a center frequency of 881 MHz and a bandwidth of 25 MHz. The filtered signal is then preferably mixed at mixer 305 with reception local oscillator signal 306 (output by synthesizer section 300) which has been amplified by amplifier 307. Preferably, mixer 305 is a model CMY210 881 MHZ–1960 MHz upconverter from Siemens AG, of Munich, Germany, and amplifier 307 is preferably a model UPC2709T from NEC Corporation, of Tokyo, Japan.

The mixed signal is then preferably filtered again at filter 308, which preferably is a model MDR029B filter from Soshin Electric Co., Ltd., of Tokyo, Japan, having a center frequency of 1960 MHz and a bandwidth of 60 MHz, before being amplified by power amplifier 309, which preferably is a model CGY62 from Siemens AG, of Munich, Germany. The signal is then filtered again at filter 310, which preferably is identical to filter 308, and then fed to duplexer 35.

Synthesizer section 300 preferably is based on a LMX23335MX/SL162908 dual frequency synthesizer (PLL) 311 from National Semiconductor Corporation, of Santa Clara, Calif., driving two voltage-controlled oscillators 312, 313 (with suitable feedback at 314, 315 respectively) centered at frequencies of 1024.98 MHz and 1060.02 MHz respectively. VCOs 312, 313 are preferably model MQE570-966 voltage controlled oscillators from Murata Manufacturing Co., Ltd., of Kyoto, Japan.

Temperature-compensated crystal oscillator 316 (preferably a model TCO-986T-19.44MHZ-4V 19.44 MHz oscillator from Toyo Communication Equipment Co., Ltd., of Tokyo, Japan, preferably provides a stable reference for PLL 311. Control lines 15 of PLL 311 connect either to personal computer 14 (in system 10) or base station 21 (in system 20) as discussed above.

Thus it is seen that a converter that allows equipment designed for one mobile telephone standard to be used with mobile telephones designed for a different mobile telephone standard, including an adapter that allows testing equipment for one type of mobile telephone to be used to test a different type of mobile telephone, and an adapter that allows a base station for one type of mobile telephone to be used with a different type of mobile telephone, has been provided. One skilled the art will appreciate that the present invention can be implemented by other than the described embodiments, which are presented for purposes of illustration and not of limitation, and the present invention is limited only by the claims that follow.

What is claimed is:

1. Base station apparatus for communicating with a mobile telephone, said mobile telephone being of a first type which transmits, at any one time, on one transmit frequency of a first set of transmit frequencies and which receives, at any one time, on one receive frequency of a first set of receive frequencies, said base station apparatus comprising:

a base station unit for communicating with mobile telephones of a second type each of said mobile telephones of said second type transmitting, at any one time, on a respective one transmit frequency of a second set of transmit frequencies and receiving, at any one time, on a respective one receive frequency of a second set of receive frequencies; and an adapter comprising:

a first interface which receives from said mobile telephone of said first type a signal at said one transmit frequency of said first set of transmit frequencies and which transmits to said mobile telephone of said first type a signal at said one receive frequency of said first set of receive frequencies, a second interface which receives from said base station unit a signal at said one receive frequency of said second set of receive frequencies and which transmits to said base station unit a signal at said one transmit frequency of said second set of transmit frequencies, a first propagation path which propagates said signal at said one transmit frequency of said first set of transmit frequencies from said first interface to said second interface, a second propagation path which propagates said signal at said one receive frequency of said second set of receive frequencies from said second interface to said first interface, a first frequency converter along said first propagation path which converts said one transmit frequency of said first set of transmit frequencies to a corresponding frequency of said second set of transmit frequencies, and a second frequency converter along said second propagation path which converts said one receive frequency of said second set of receive frequencies to a corresponding frequency of said first set of receive frequencies.

2. The base station apparatus of claim 1 wherein said first and second frequency converters comprise, respectively, a first mixer and a first local oscillator, and a second mixer and a second local oscillator.

3. The base station apparatus of claim 2 wherein each of said first and second local oscillators comprises a respective voltage controlled oscillator and a respective phase-lock loop circuit.

4. The base station apparatus of claim 3 wherein said phase-lock loop circuit of said first oscillator and said phase-lock loop circuit of said second oscillator are included in one dual phase-lock loop device.

5. The base station apparatus of claim 4 wherein said dual phase-lock loop device comprises a control input for selecting frequencies of said first and second oscillators.

6. The base station apparatus of claim 3 wherein each said phase-lock loop circuit comprises a respective control input for selecting a respective frequency of said first and second oscillators.

7. The base station apparatus of claim 1 wherein:

said mobile telephone is a PCS telephone;

said base station unit is a cellular base station unit for communicating with cellular telephones;

said first set of transmit frequencies ranges from about 1850.01 MHz to about 1909.95 MHz;

said first set of receive frequencies ranges from about 1930.05 MHz to about 1989.99 MHz;

said second set of transmit frequencies ranges from about 824.01 MHz to about 848.97 MHz; and said first set of receive frequencies ranges from about 869.01 MHz to about 893.97 MHz.

* * * * *